United States Patent
Villacorte et al.

(10) Patent No.: US 12,372,986 B2
(45) Date of Patent: Jul. 29, 2025

(54) CONTROL SYSTEM AND METHOD FOR SUPPRESSING BIOLOGICAL GROWTH, SCALE FORMATION AND/OR CORROSION IN A RECIRCULATING EVAPORATIVE COOLING FACILITY

(71) Applicant: GRUNDFOS HOLDING A/S, Bjerringbro (DK)

(72) Inventors: Loreen Ople Villacorte, Bjerringbro (DK); Bruno Kiilerich, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 708 days.

(21) Appl. No.: 17/551,468

(22) Filed: Dec. 15, 2021

(65) Prior Publication Data
US 2022/0197315 A1 Jun. 23, 2022

(30) Foreign Application Priority Data
Dec. 18, 2020 (EP) .................................... 20215605

(51) Int. Cl.
G05D 7/06 (2006.01)
G05B 13/02 (2006.01)
(52) U.S. Cl.
CPC ......... *G05D 7/0635* (2013.01); *G05B 13/024* (2013.01)
(58) Field of Classification Search
None
See application file for complete search history.

(56) References Cited

U.S. PATENT DOCUMENTS

| | | | |
|---|---|---|---|
| 2011/0278208 A1* | 11/2011 | Namba | G01N 31/221 210/87 |
| 2014/0260370 A1 | 9/2014 | Carew | |
| 2015/0175459 A1* | 6/2015 | Hofmann | C02F 5/00 137/98 |
| 2015/0330725 A1 | 11/2015 | Gurney | |
| 2017/0209834 A1 | 7/2017 | Cohen et al. | |
| 2018/0155221 A1* | 6/2018 | Curran | C02F 1/46114 |
| 2022/0111335 A1* | 4/2022 | Mori | C02F 1/444 |
| 2022/0194819 A1* | 6/2022 | Zhao | C02F 1/008 |
| 2022/0340448 A1* | 10/2022 | LaRocque | B01D 1/02 |

* cited by examiner

*Primary Examiner* — Kamini S Shah
*Assistant Examiner* — Istiaque Ahmed
(74) *Attorney, Agent, or Firm* — McGlew and Tuttle, P.C.

(57) ABSTRACT

A control system suppresses biological growth, scale formation and/or corrosion in a recirculating evaporative cooling facility (1). The control system is configured to: monitor a value (C) from at least one sensor (19a-l). The value is indicative of an ion concentration in a cooling liquid of the recirculating evaporative cooling facility (1). The control system controls at least one flow regulation device (21, 23) for regulating the hydraulic operation of at least one de-ionising unit (13) of the recirculating evaporative cooling facility (1). The control system is configured to control at least one parameter of hydraulic operation of the at least one de-ionising unit (13) based on an adaptive target water saving as long as the monitored value (C) does not pass a pre-determined threshold.

18 Claims, 4 Drawing Sheets

CONTROL SYSTEM AND METHOD FOR SUPPRESSING BIOLOGICAL GROWTH, SCALE FORMATION AND/OR CORROSION IN A RECIRCULATING EVAPORATIVE COOLING FACILITY

CROSS REFERENCE TO RELATED APPLICATIONS

This application claims the benefit of priority under 35 U.S.C. § 119 of European Application 20215605.5, filed Dec. 18, 2020, the entire contents of which are incorporated herein by reference

TECHNICAL FIELD

The present disclosure relates to a control system and method for suppressing biological growth, scale formation and/or corrosion in a recirculating evaporative cooling facility, in particular in a cooling tower.

BACKGROUND

A typical recirculating evaporative cooling facility comprises an evaporative cooling tower (ECT) that is fed with cooling water in a reservoir, e.g. a basin. Part of the cooling water is normally pumped out of the reservoir to a heat exchanger. The heated water leaving the heat exchanger is fed through the ECT where it is cooled and then returned back to the reservoir. A fraction of the water passing through the ECT is lost mainly due to evaporation plus other losses. Over time, the water level in the reservoir will decrease and the water salinity will increase. In order to prevent scaling/corrosion issues, the specific salt concentration in the cooling water should be maintained within limits set by the ECT operator. This is usually implemented by discharging a certain part of the cooling water known as blowdown water (BD) and/or adding fresh make-up water (MU) to the reservoir. In order to further suppress biological growth, scale formation and corrosion in the system, different chemicals are usually added to the cooling water. Therefore, ECT as known in the prior art use up a significant volume of fresh make-up water (MU) and chemicals while producing significant amounts of wastewater (BD) that is contaminated by high concentrations of dissolved salts and chemicals.

US 2015/0330725 A1 describes a reverse osmosis recycling circuit for reducing the amount of contaminated wastewater by de-ionising the cooling water. The system of US 2015/0330725 A1 is, however, not able to achieve a desired make-up water saving or a desired blowdown water reduction. Furthermore, the reverse osmosis cycle of US 2015/0330725 A1 is not controlled efficiently in order to reduce the number of expensive membrane cleanings.

It is thus an object of the present disclosure to provide a control system and method to achieve at least a desired make-up water saving and/or a desired blowdown water reduction while efficiently suppressing biological growth, scale formation and corrosion in a recirculating evaporative cooling facility.

SUMMARY

According to a first aspect of the present disclosure, a control system for suppressing biological growth, scale formation and/or corrosion in a recirculating evaporative cooling facility is provided, wherein the control system is configured to:

monitor a value from at least one sensor, wherein the value is indicative of an ion concentration in a cooling liquid of the recirculating evaporative cooling facility, and control at least one flow regulation device for regulating the hydraulic operation of at least one de-ionising unit of the recirculating evaporative cooling facility, wherein the control system is configured to control at least one parameter of hydraulic operation of the at least one de-ionising unit based on an adaptive target water saving as long as the monitored value does not pass a pre-determined threshold.

The principle is here to aim for a maximum amount of water saving by controlling the hydraulic operation of the de-ionising unit if the ion concentration in the cooling liquid allows it. In other words, the frequency, extent and/or intensity of operating the de-ionising unit is controlled with the goal to yield an adaptive target water saving. The control system described above yields maximum water savings while a sufficient suppression of biological growth, scale formation and/or corrosion in the recirculating evaporative cooling facility is ensured. It should be noted herein that the term "de-ionising" shall include any reduction of one or more kind of ions by any means, including desalination, physical filtering and/or chemical reaction.

Optionally, the control system may comprise a control module, the at least one sensor and the at least one flow regulation device, wherein the control module has a wired or wireless signal connection to the at least one sensor and to the at least one flow regulation device. The control module may be implemented as hardware or software on a computer, a programmable logic controller (PLC) or cloud-based computing system. Alternatively, or in addition, the control module may be implemented as hardware or software in control electronics of the at least one sensor and/or the at least one flow regulation device.

Optionally, the at least one sensor may be configured and arranged to measure an ion concentration and/or an electrical conductivity. The electrical conductivity is typically correlated with the ion concentration and may thus be used to measure the ion concentration. However, there may be other ways of measuring and indicating the ion concentration. Typical ions to filter out may be sulphate $SO_4^{2-}$, calcium $Ca^{2+}$, chloride $Cl^-$, silica or others. Alternatively, or in addition, the at least one sensor may be configured and arranged to measure a concentration of dissolved and/or suspended organic or non-organic matter. For instance, a transmission and/or absorption and/or diffraction of light in the cooling liquid may be measured to monitor a degree of con-Lamination.

Optionally, the at least one flow regulation device may comprise at least one pump and/or at least one valve. In particular, the speed of the at least one pump and/or the number of running pumps may be controllable by the control module. Preferably, the control module may be configured to control the opening degree of the at least one valve and/or which of the at least one valve to open or close. The at least one pump and/or valve may be pressure-controlled or flow-controlled. One or more pressure values from one or more pressure sensors and/or one or more flow values from one or more flow sensors may be used as a feed-back value in a closed-loop control to establish a target input pressure at the at least one de-ionising unit and/or a target flow through the at least one de-ionising unit.

Optionally, the at least one parameter of hydraulic operation of the at least one de-ionising unit may be a frequency of de-ionising cycles and/or a flow through the at least one de-ionising unit and/or a de-ionising duration per de-ionising cycle. The de-ionising duration per de-ionising cycle may be correlated with the frequency of de-ionising cycles or with the inverse of the flow, or set independently of either. Preferably, the parameters of hydraulic operation of the at least one de-ionising unit may be controlled according to a prioritisation scheme.

Optionally, the control system may be configured to increase the flow through the at least one de-ionising unit only if the frequency of de-ionising cycles and/or the de-ionising duration per de-ionising cycle has reached a maximum. Preferably, if more de-ionising is needed, the frequency of de-ionising cycles is increased as the first choice. If the frequency of de-ionising cycles is at a maximum and still more de-ionising is needed, the flow through the at least one de-ionising unit is increased as the second choice. Vice versa, if less de-ionising is needed, the flow through the at least one de-ionising unit is decreased as the first choice. If flow through the at least one de-ionising unit is at an initial value and still less de-ionising is needed, the frequency of de-ionising cycles is decreased as the second choice. The reason for this prioritisation scheme is that the performance of the at least one de-ionising unit degrades with increasing flow, so that the flow through the at least one de-ionising unit is preferably kept as low as possible. The de-ionising duration per de-ionising cycle may be reduced inversely to the increase of the flow in order to maintain the total de-ionised volume per de-ionising cycle.

Optionally, the adaptive target water saving may be indicative of a target reduction of blow-down water and/or make-up water. For instance, the adaptive target water saving may be initially set to 10% or another initial value. The adaptive target water saving may be interpreted as a targeted relative reduction of blow-down water and/or make-up water compared to the blow-down water and/or make-up water that would be consumed without using the control system disclosed herein. So, fixed or configurable parameters of a conventional setting may be stored or input that determine a reference evaporative cooling facility with a reference blow-down water production and/or reference make-up water consumption.

Optionally, the control system may be configured to recursively control the at least one parameter of hydraulic operation of the at least one de-ionising unit, wherein the at least one parameter of hydraulic operation of the at least one de-ionising unit is increased at least if the monitored value is changing towards the pre-determined threshold at a rate exceeding a pre-determined rate limit, and wherein the adaptive target water saving is increased at least if the monitored value is outside a pre-determined range about the pre-determined threshold and is not changing towards the pre-determined threshold at a rate exceeding the pre-determined rate limit and the at least one parameter of hydraulic operation of the at least one de-ionising unit is at a respective initial parameter.

It is thus preferred that a rate of change over time, i.e. slope or first derivative, of the value indicative of the ion concentration is monitored. For instance, a first value indicative of the ion concentration at the beginning of each de-ionising cycle and a second value indicative of the ion concentration at the end of each de-ionising cycle or at the beginning of the subsequent de-ionising cycle may be measured. The differential between the first value and the second value divided by the de-ionising cycle duration may be considered as an average rate of change, i.e. slope, of the value indicative of the ion concentration. This means on the one hand that preferably the frequency of de-ionising cy-Iles is increased first if the ion concentration is changing too quickly towards the pre-determined threshold. If the frequency of de-ionising cycles is at a maximum, the flow through the at least one de-ionising unit is increased to further intensify the de-ionising. On the other hand, if the ion concentration has a sufficient distance to the pre-determined threshold and is changing away or not too quickly towards the threshold, the flow through the at least one de-ionising unit is decreased first to relax the de-ionising. If the flow is at an initial flow, the frequency of de-ionising cycles is decreased to relax the de-ionising further. If both the flow and the frequency are at initial values, the target water saving is increased to save more water. It should be noted, however, if the adaptive target water saving is below the initially set target water saving, the adaptive target water saving may be increased first to reach the initial target water saving before decreasing the flow and the frequency. The recursive control may be performed in control loops that may coincide with the de-ionising cycles, i.e. one or more parameters may be changed by one pre-defined step per de-ionising cycle. It should be noted that the wording "at least if" used herein shall mean that a sufficient, but not necessary condition for an action follows. This means that the action may also apply under one or more other conditions. The pre-determined rate limit may be a fixed set limit or adaptive. For instance, the pre-determined rate limit may be set to be the rate of change in the previous cycle or an average of the rate of change over more than one previous cycle.

Optionally, the control system may be configured to recursively control the at least one parameter of hydraulic operation of the at least one de-ionising unit, wherein the at least one parameter of hydraulic operation of the at least one de-ionising unit and the adaptive target water savings are maintained at least if the monitored value is within a pre-determined range about the pre-determined threshold and changing towards the pre-determined threshold at rate not exceeding a pre-determined rate limit. The rationale is here to keep the ion concentration below the pre-determined threshold with the current settings without compromising on the adaptive target water savings. In this situation, the current settings are nearly optimal and the target water savings are close to maximum. So, the settings are maintained for the next de-ionising cycle in this case.

Optionally, the control system may be configured to recursively control the at least one parameter of hydraulic operation of the at least one de-ionising unit, wherein the adaptive target water saving is decreased at least if the monitored value is changing towards the pre-determined threshold at a rate exceeding a pre-determined rate limit and the at least one parameter of hydraulic operation of the at least one de-ionising unit is at a respective parameter maximum, and wherein the at least one parameter of hydraulic operation of the at least one de-ionising unit is decreased at least if the monitored value is changing away from the pre-determined threshold and the adaptive target water saving is at or above an initial target water saving. This means on the one hand that the adaptive target water saving is reduced if the de-ionising intensity is at a maximum, i.e. cycle frequency and flow are at a maximum, and the ion concentration is quickly changing towards the threshold. This is a situation in which the target water saving set in one cycle cannot be achieved in the following cycle, because increasing the make-up water and/or blow-down water is the only option left to keep or push the ion concentration below the threshold. On the other hand, the de-ionising can be relaxed, preferably firstly by decreasing the flow and secondly by decreasing the cycle frequency, if the ion concentration is dropping and the target water saving is at or above the initially set value. If the adaptive target water saving is below the initially set target water saving, the adaptive target water saving may be increased first to reach the initial target water saving before relaxing the de-ionising.

Optionally, the control system may be configured to monitor a performance value of the at least one de-ionising unit and trigger a regeneration cycle and/or cleaning cycle of the at least one de-ionising unit if the performance value crosses a pre-determined performance threshold. Such a regeneration cycle and/or cleaning cycle may be a cleaning-in-place (CIP) procedure for the at least one de-ionising unit. The performance value may be, for instance, a permeability, as an absolute or relative value or in a normalised and/or temperature-corrected form, of a membrane or filter of the at least one de-ionising unit. Alternatively, or in addition, the performance value may comprise a net driving pressure (NDP), a pressure drop ($\Delta p$), a membrane hydraulic resistance (R), or a salt rejection (SR), any of which as an absolute or relative value or in a normalised and/or temperature-corrected form. Please note that, depending on the choice of the performance value, the pre-determined performance threshold may be a maximum or a minimum. The pre-determined performance threshold may in this case be a minimum permeability that the at least one de-ionising unit must at least have. Over time, the membrane or filter clogs more and more and the permeability of a membrane or filter drops. The regeneration cycle and/or cleaning cycle may use chemicals, counter-flow, exchange, mechanical cleaning and/or other means to re-establish a good de-ionising performance. The de-ionising cycling may be interrupted as long as the regeneration cycle and/or cleaning cycle is ongoing or as long as the performance value is not brought back over the pre-determined performance threshold.

Optionally, the control system may be configured to recursively adapt or adjust the adaptive target water saving, wherein the adaptive target water saving is increased at least if the adaptive target water saving is below an initial target water saving and
  the monitored value is changing away from the pre-determined threshold or
  the monitored value is outside a pre-determined range about the pre-determined threshold and is not changing towards the pre-determined threshold at a rate exceeding the pre-determined rate limit.

This maximises the water savings to at least the initially set target water saving when the decreasing ion concentration indicates that there is room for water savings. Above the initially set target water saving, a further water saving may be achieved by further increasing the target water saving if both the de-ionising flow and the cycle frequency are at initial or minimal values.

Optionally, the at least one de-ionising unit comprises one or more of the group comprising:
  a reverse osmosis (RO) unit,
  a nanofiltration (NF) unit,
  a membrane distillation unit,
  an electro de-ionisation (EDI) unit,
  an electrodialysis (ED) unit,
  a capacitive de-ionisation (CDI) unit,
  an ion exchange (IX) unit, and
  one or more filters for filtering non-dissolved particles in the cooling liquid.
So, one, more or any combination of the above units and their variants arranged in parallel and/or in series may be used to de-ionise and filter the cooling.

Optionally, the control system may be configured to operate the at least one de-ionising unit in and/or selectively switch between any operation mode in the group comprising:
  a batch mode,
  a continuous-batch mode, and
  a continuous mode.
In all modes, the permeate (also referred to as product) leaving the de-ionising unit is led back into the cooling circuit of the recirculating evaporative cooling facility. In a continuous mode, which may be used when a relatively low water saving is acceptable, the de-ionising unit is directly fed with cooling water from the cooling circuit and the retentate (also referred to as brine, reject or concentrate) is directly discarded. In a batch mode, a batch of cooling water from the cooling circuit is transferred directly, or via the de-ionising unit without de-ionising the cooling liquid, to a feed tank, which is then feeding the de-ionising unit for de-ionisation. The retentate is led back to the feed tank from where at least a portion of the retentate is recirculated through the de-ionising unit until the end of the de-ionizing cycle when the remaining retentate in the feed tank is discarded. This is particularly advantageous if higher water savings are to be achieved. In a continuous-batch mode, which is a modified batch mode, the de-ionizing operation is implemented in two steps. The first step involves feeding the de-ionizing unit with cooling water directly from the cooling circuit just as in continuous mode, but the retentate is not discarded. It is collected in a feed tank. The second step involves feeding the de-ionizing unit with retentate collected in the feed tank in the previous step, wherein the resulting retentate is again led back to the feed tank from where at least a portion of the retentate is, while producing permeate, recirculated through the de-ionizing unit until the end of the de-ionizing cycle when the remaining retentate in the feed tank is discarded. When the feed tank is full or reached a certain filling level, it may switch to batch mode, or the system may change within continuous-batch mode from the first step to the second step. So, a combination of operation modes is also possible, e.g. starting in continuous-batch mode if the feed tank is empty and continuing in batch mode once a certain filling level is reached in the feed tank.

It should be noted that a continuous mode does not provide a large water saving potential once the system is set up and running. Therefore, a batch mode or continuous-batch mode is preferred for the present invention to make use of varying needs for de-ionisation that open room for maximising water savings.

According to a second aspect of the present disclosure, a recirculating evaporative cooling facility is provided comprising a control system as described above.

According to a third aspect of the present disclosure, a method is provided for suppressing biological growth, scale formation and/or corrosion in a recirculating evaporative cooling facility, wherein the method comprises:
  monitoring a value being indicative of an ion concentration in a cooling liquid of the recirculating evaporative cooling facility, and
  controlling at least one flow regulation device for regulating the hydraulic operation of at least one de-ionising unit of the recirculating evaporative cooling facility, wherein at least one parameter of hydraulic operation of the at least one de-ionising unit is controlled based on an adaptive target water saving as long as the monitored value does not pass a pre-determined threshold.

Optionally, the method may comprise determining the value by measuring an ion concentration and/or an electrical conductivity by means of at least one sensor.

Optionally, controlling the at least one flow regulation device may comprise any of the group comprising:
- switching on at least one pump,
- controlling a speed of at least one pump,
- closing or opening at least one valve, and
- controlling an opening degree of at least one valve.

Optionally, the at least one parameter of hydraulic operation of the at least one de-ionising unit may be a frequency of de-ionising cycles and/or a flow through the at least one de-ionising unit and/or a de-ionising duration per de-ionising cycle.

Optionally, the flow through the at least one de-ionising unit may be only increased if the frequency of de-ionising cycles and/or de-ionising duration per de-ionising cycle has reached a maximum.

Optionally, the adaptive target water saving may be indicative of a reduction of blow-down water and/or make-up water.

Optionally, the at least one parameter of hydraulic operation of the at least one de-ionising unit may be controlled recursively, wherein the at least one parameter of hydraulic operation of the at least one de-ionising unit is increased at least if the monitored value is changing towards the pre-determined threshold at a rate exceeding a pre-determined rate limit, and wherein the adaptive target water saving is increased at least if the monitored value is outside a pre-determined range about the pre-determined threshold and is not changing towards the pre-determined threshold at a rate exceeding the pre-determined rate limit and the at least one parameter of hydraulic operation of the at least one de-ionising unit is at a respective initial parameter.

Optionally, the at least one parameter of hydraulic operation of the at least one de-ionising unit may be controlled recursively, wherein the at least one parameter of hydraulic operation of the at least one de-ionising unit and the adaptive target water saving are maintained at least if the monitored value is within a pre-determined range about the pre-determined threshold and changing towards the pre-determined threshold at rate not exceeding a pre-determined rate limit.

Optionally, the at least one parameter of hydraulic operation of the at least one de-ionising unit may be controlled recursively, wherein the adaptive target water saving is decreased at least if the monitored value is changing towards the pre-determined threshold at a rate exceeding a pre-determined rate limit and the at least one parameter of hydraulic operation of the at least one de-ionising unit is at a respective parameter maximum, and wherein the at least one parameter of hydraulic operation of the at least one de-ionising unit is decreased at least if the monitored value is changing away from the pre-determined threshold and the adaptive target water saving is at or above an initial target water saving.

Optionally, the method may further comprise monitoring a performance value of the at least one de-ionising unit and triggering a regeneration cycle and/or a cleaning cycle of the at least one de-ionising unit if the performance value crosses a pre-determined performance threshold.

Optionally, the adaptive target water saving may be adapted recursively, wherein the adaptive target water saving is increased at least if the adaptive target water saving is below an initial target water saving and
- the monitored value is changing away from the pre-determined threshold or
- the monitored value is outside a pre-determined range about the pre-determined threshold and is not changing towards the pre-determined threshold at a rate exceeding the pre-determined rate limit.

Optionally, the method may further comprise operating the at least one de-ionising unit in and/or selectively switching between any operation mode in the group comprising:
- a batch mode,
- a continuous-batch mode, and
- a continuous mode.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

Embodiments of the present disclosure will now be described by way of example with reference to the following figures of which.

DESCRIPTION OF PREFERRED EMBODIMENTS

Figure 1:
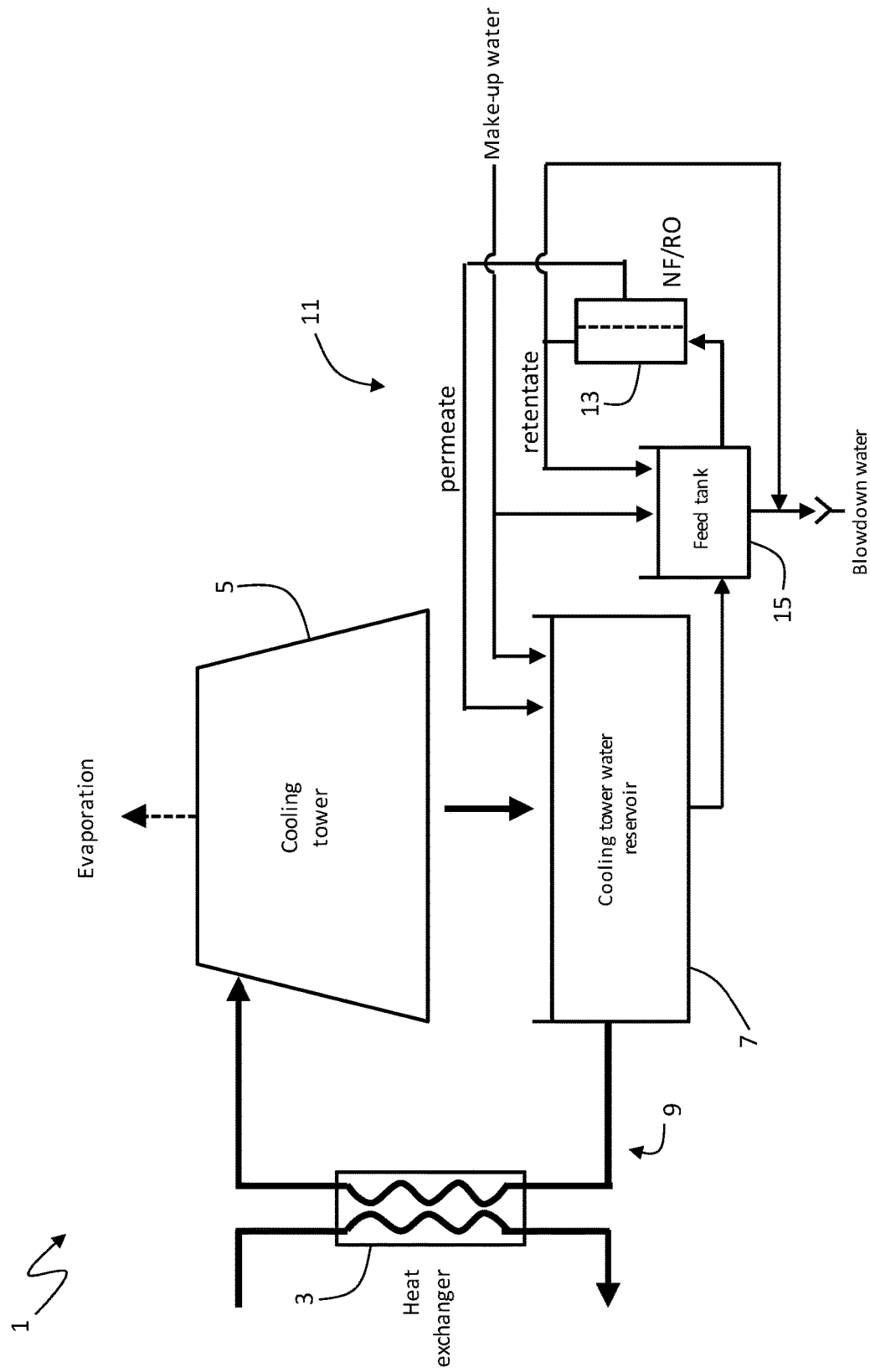
FIG. 1 is a schematic representation of an example of a recirculating evaporative cooling facility as disclosed herein.

FIG. 1 shows a recirculating evaporative cooling facility 1 comprising a heat exchanger 3, a cooling tower 5 and a cooling water reservoir 7. Cooling water from the reservoir 7 flows through the heat exchanger 3 for receiving thermal energy. The heated-up cooling water leaves the heat exchanger and cools down in the cooling tower 5, where it loses thermal energy, especially by a certain amount of evaporation. Apart from further losses in the cooling tower 5, the remaining cooling water is fed back into the reservoir 7 to close the cooling circuit 9. The remaining cooling water entering the reservoir 7, however, has a higher ion concentration than the cooling water leaving the reservoir 7. Therefore, the ion concentration increases over time within the total cooling water in the cooling circuit 9. A high ion concentration may, however, be a problem for the recirculating evaporative cooling facility 1, because it facilitates biological growth, scale formation and/or corrosion.

In order to supress biological growth, scale formation and/or corrosion, the ion concentration must be kept below a pre-determined threshold, typically defined by the operator of the recirculating evaporative cooling facility 1. Therefore, the recirculating evaporative cooling facility 1 comprises a filtration side-stream 11 with a de-ionising unit 13, here in form of a nanofiltration or reverse-osmosis filter. The cooling water in the reservoir 7 is pumped via the filtration side-stream 11 through the de-ionising unit 13. The permeate (also referred to as product) of the de-ionising unit 13 has a low ion concentration and is fed back into the reservoir 7 to reduce the ion concentration therein. The retentate (also referred to as brine or concentrate) of the de-ionising unit 13 has a high ion concentration.

Depending on the operation mode of the de-ionising unit 13, the retentate may be discharged directly as blowdown (BD) water (continuous mode) or fed into a feed tank 15 (batch or continuous-batch mode). The feed tank 15 is here used to recirculate at least a certain fraction of retentate through the de-ionising unit 13 again. In a batch mode, a batch of cooling water from the cooling circuit 9 is transferred directly, or via the de-ionising unit 13 without de-ionising the cooling liquid, to the feed tank 15, which is then feeding the de-ionising unit for de-ionisation. The retentate is led back to the feed tank 15 from where at least a portion of the retentate is recirculated through the de-ionising unit 13 until the end of the de-ionizing cycle when the remaining retentate in the feed tank 15 is discarded. In a continuous-batch mode, which is a modified batch mode, the de-ionizing operation is implemented in two steps. The first step involves feeding the de-ionizing unit 13 with cooling water directly from the cooling circuit 9 just as in continuous mode, but the retentate is not discarded. It is collected in the feed tank 15. The second step involves feeding the de-ionizing unit 13 with retentate collected in the feed tank 15 during the previous step, wherein the resulting retentate is again led back to the feed tank 15 from where at least a portion of the retentate is, while producing permeate, recirculated through the de-ionizing unit 13 until the end of the de-ionizing cycle when the remaining retentate in the feed tank 15 is discarded. When the feed tank 15 is full or reached a certain filling level, the operation is switched to batch mode.

Figure 2:
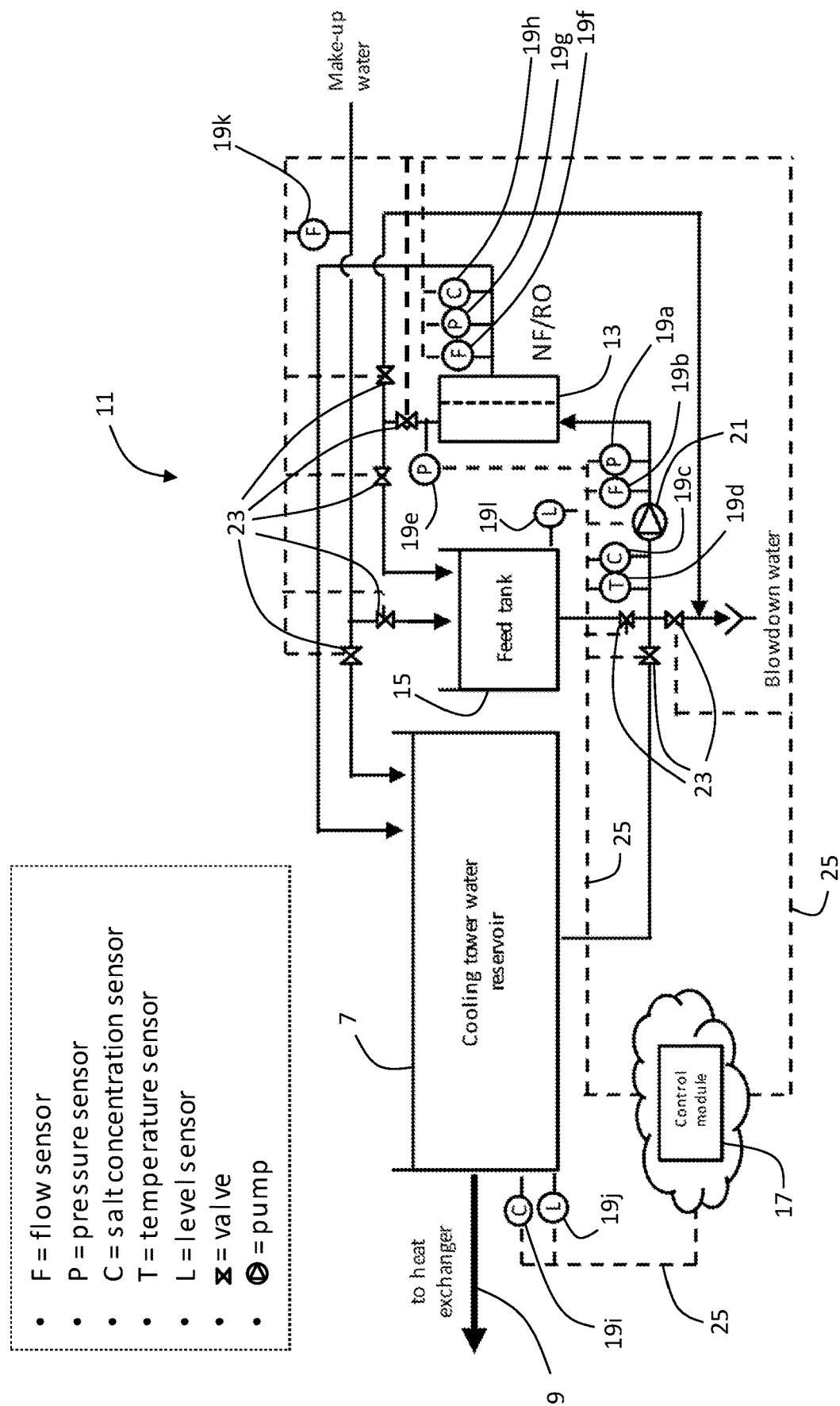
FIG. 2 is a schematic representation showing more detail of a filtration side-stream of the recirculating evaporative cooling facility as shown in FIG. 1.

FIG. 2 shows the filtration side-stream 11 of the recirculating evaporative cooling facility 1 in more detail with a control system for suppressing biological growth, scale formation and/or corrosion. The control system comprises a control module 17 implemented as hardware or software on a computer or cloud-based computing system. The control system further comprises a plurality of sensors 19a-l and flow regulation de-vices in form of a pump 21 and several valves 23. The control module has a wired or wireless signal connection 25 (dashed lines) to each sensor 19, the pump 21 and each valve 23 for receiving values and/or setting parameters of hydraulic operation of the de-ionising unit 13. The control module 17 controls the hydraulic operation of the of the de-ionising unit 13 by controlling the pump 21 and the valves 23 on the basis of the received values measured by the sensors 19. The pump 21 is installed upstream of the de-ionising unit 13 to provide an input pressure measured by a pressure sensor 19a upstream of the de-ionising unit 13. In order to measure the de-ionising performance, a flow sensor 19b, an ion concentration sensor 19c and a temperature sensor 19d are also installed upstream of the de-ionising unit 13. The output pressure at the retentate line is measured downstream of the de-ionising unit 13 by a pressure sensor 19e. The flow, pressure, and ion concentration of the permeate is measured downstream of the de-ionising unit 13 by sensors 19f, 19g, 19h.

An ion concentration sensor 19i installed at the reservoir 7 measures the ion concentration of the cooling water within the reservoir 7. A level sensor 19j installed at the reservoir 7 measures the filling level of the reservoir 7. The control module 17 controls a valve 23 in the MU water line to fill the reservoir to keep the level above a set minimum. A flow sensor 19k measures the flow of MU water. A level sensor 19l in the feed tank 15 indicates when to switch operation modes or a blowdown of the feed tank 15.

The three valves 23 in the retentate line may be particularly important to control the hydraulic operation of the de-ionising unit 13. The valve 23 directly downstream the pressure sensor 19e in the retentate line is a regulating valve which can be opened and closed to a degree controlled by the control module 17. It can be used to control the pressure in the de-ionising unit 13 and thereby indirectly the permeate flow and/or the retentate flow. The valve 23 further downstream in the retentate line towards a blowdown water drain can be opened to switch to continuous mode, whereas the third valve 23 in the retentate line towards the feed tank 15 is opened for operating in batch mode or continuous-batch mode.

Figure 3:
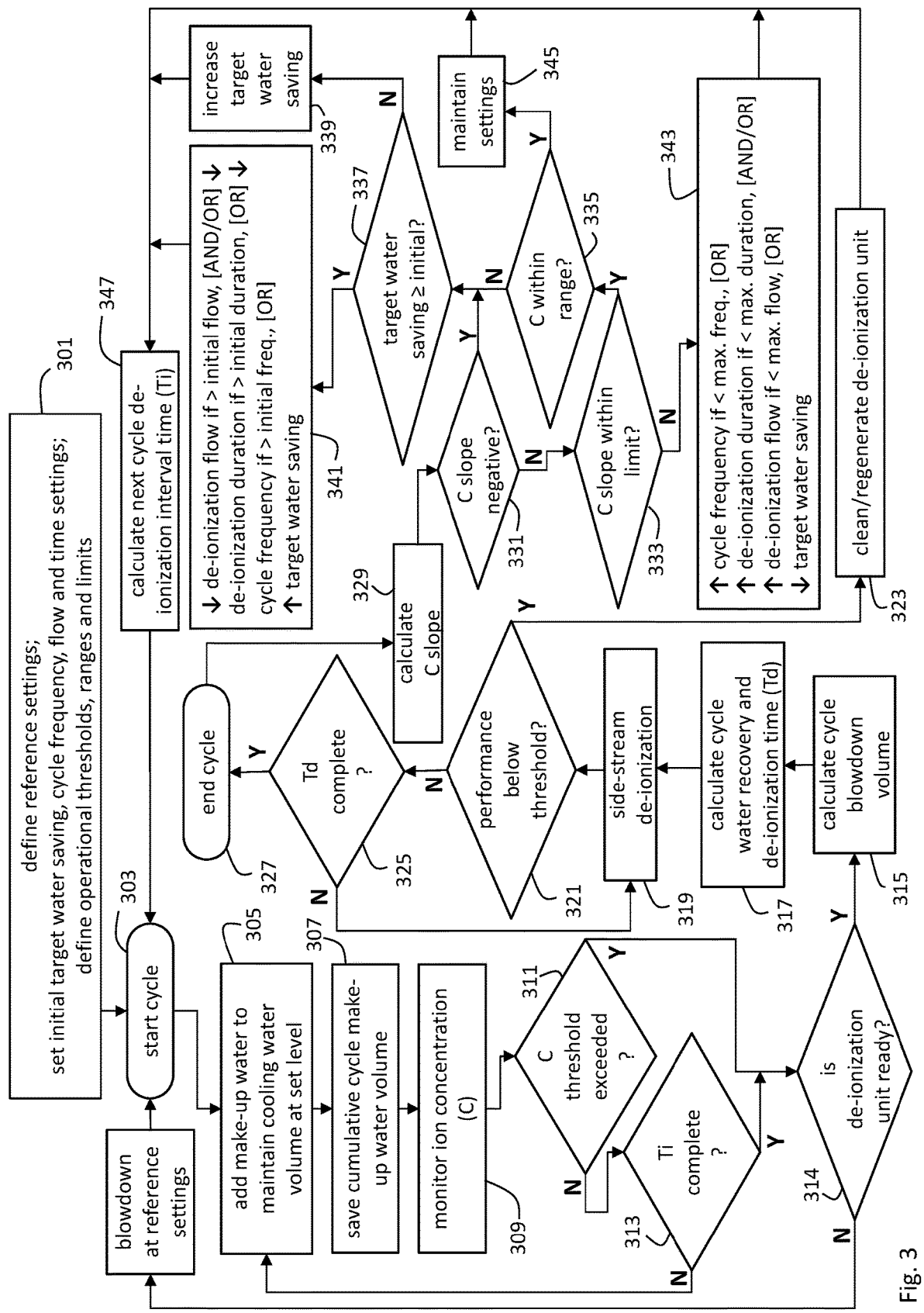
FIG. 3 is a schematic flow diagram of an example of a method disclosed herein.

FIG. 3 shows a flow diagram that shows how the control system is used to save as much water as possible while suppressing successfully biological growth, scale formation and/or corrosion in the recirculating evaporative cooling facility 1. The control module 17 may comprise a user interface for an operator to define reference settings, initial parameters, target water savings, thresholds, ranges and limits in step 301. Alternatively, or in addition, the control system may be pre-configured with default reference settings, initial parameters, target water savings, thresholds, ranges and limits. In particular, the parameters and target water savings are adapted recursively by the applied algorithm.

Due to evaporation in the cooling tower 5, a certain amount of makeup (MU) water and blowdown (BD) water is inevitable. However, the amount of evaporation may vary with different weather conditions and thus the need for de-ionisation may vary. A typical measure in this regard is cycle-of-concentration (CoC) that specifies the number of times water parameters (hydraulic or ionic) in the reservoir are concentrated relative to the make-up water. CoC can be calculated as the ratio $$CoC = \frac{C_{CC}}{C_{MU}}$$

between me ion concentration in the cooling circuit $C_{cc}$ and the ion concentration in the makeup water $C_{MU}$. The suitable measure $$X_a = \frac{V_{MU}}{V_{BD}},$$

for the water consumption is wherein $V_{MU}$ is the makeup water volume and $V_{BD}$ is the blowdown water volume. A reference recirculating evaporative cooling facility may have a reference CoCr and a reference water consumption $X_r$. An initial target water saving WS, e.g. in percent, may be defined as a makeup water saving $$WS_{MU} = 1 - \frac{\left(1 - \frac{1}{X_r}\right)}{\left(1 - \frac{1}{X_a}\right)}$$

or a blowdown water saving $$WS_{BD} = 1 - \frac{(X_r - 1)}{(X_a - 1)}.$$

For instance, it $WS_{MU}$ is set to 10% initially, it means that the initial goal is to use 10% less makeup water compared to a reference recirculating evaporative cooling facility, which is preferably based on common knowledge about, experience with or a fictive model of essentially the same recirculating evaporative cooling facility without the control system disclosed herein.

The initial cycle frequency may be set by the number N of de-ionising cycles per day, preferably to a minimum cycle frequency. A maximum cycle frequency, e.g. a maximum number of cycles per day $$N_{max} = \frac{24}{T_d},$$

may be limited by the de-ionisation duration $T_d$ per cycle, i.e. de-ionisation is not stopped between cycles at maximum cycle frequency. A cycle frequency below the maximum cycle frequency means that there is a time $T_i$ available between the de-ionisation durations $T_d$. The cycle period is $T_i+T_d$.

The initial flow through the de-ionising unit 13 is also initially set, preferably to a minimum flow within a flow range recommended by the manufacturer of the de-ionising unit. As the performance of the de-ionising unit 13 degrades quicker at higher flows, the flow through the de-ionising unit 13 is preferably kept as low as possible for as long as possible.

After the initial definitions and settings in step 301, the cycle starts at step 303 and in following step 305, the water level in the reservoir as indicated by level sensor 19j is monitored and MU water added if needed to keep the water level above a defined minimum level. The MU water flow is measured by flow sensor 19k and used to record the cumulative make water volume $V_{MU}$ in step 307. The ion concentration C is monitored in step 309 by means of the ion concentration sensor 19i. If the ion concentration has exceeded a pre-determined threshold, an extraordinary de-ionising cycle is started immediately (step 311). Otherwise, the water level and the ion concentration are monitored until time $T_i$ has lapsed (step 313). If the de-ionising unit 13 is ready for starting de-ionisation (step 314), e.g. not currently being cleaned or regenerated, de-ionising in side-stream 11 is started in step 319 after or while the blowdown volume $V_{BD}$ (step 315), water recovery WR and the de-ionising duration $T_d$ (step 317) are calculated. The blowdown volume $V_{BD}$ is based on the target water saving. The water recovery WR is determined as $$WR = 1 - \frac{V_{BD}}{V_F},$$

wherein $V_F$ is an initially set feed volume per de-ionising cycle. In batch mode or continuous-batch mode, $V_F$ is limited by the volume of the feed tank 15. In continuous mode, $V_F$ is limited by the maximum flow and the maximum cycle duration. The de-ionising duration $T_d$ per cycle can then be determined to be $$T_d = WR \cdot \frac{V_F}{Q_p},$$

wherein $Q_p$ is the permeate flow, i.e. the flow through the de-ionising unit 13. So, the de-ionising duration $T_d$ per cycle is adapted inversely to the permeate flow $Q_p$. The maximum cycle frequency, e.g. a maximum number of cycles per day $$N_{max} = \frac{24}{T_d},$$

may thus be higher for higher permeate flow $Q_p$.

In step 321, the permeability as a performance value of the de-ionising unit 13 is monitored. If the permeability or any other pre-defined performance indicator crosses a pre-determined performance threshold, de-ionising is stopped and the de-ionising unit 13 is cleaned and/or regenerated in step 323. Otherwise, de-ionising is continued until the de-ionising duration $T_d$ per cycle has lapsed (step 325) and the cycle end in step 327.

After the cycle has ended in step 327, the cycle frequency, the permeate flow $Q_p$ and the target water saving are adapted based on how the ion concentration in the reservoir 7 has developed during the cycle. An average rate of change, i.e. slope, of the ion concentration in the reservoir 7 is determined in step 329 as $$\frac{C_2 - C_1}{T_i + T_d},$$

wherein $C_1$ is the ion concentration at the start of the cycle and $C_2$ is the ion concentration at the end of the cycle.

If the slope is negative (step 331), it means that there is room for water saving. If the current target water saving is below the initial value (step 337), the target water saving is increased in step 339 by a certain amount or directly set to the initial target water saving. If the current target water saving is at or above the initial value (step 337), the permeate flow for the next cycle is reduced in step 341 and, if the permeate flow is already at the initially set minimum flow, the cycle frequency is reduced for the next cycle. If also the cycle frequency is at the initially set minimum frequency, there is even more room for water savings and the target water saving is increased. Thereby, the water saving is recursively maximised.

If the slope is positive in step 331, it is checked in step 333 if the slope exceeds a pre-determined rate limit, which may be a fixed value set in step 301 or an adaptive value, e.g. the slope of the previous cycle or an average slope over more than one previous cycle. If the slope exceeds the rate limit, it means that the ion concentration approaches the threshold too quickly and the de-ionising intensity must be increased. In step 343, the cycle frequency is recursively increased from cycle to cycle until it reaches a maximum, i.e. when $T_i=0$. If the cycle frequency is at a maximum, the permeate flow is recursively increased from cycle to cycle until it reaches a maximum. If the permeate flow is also at a maximum, the target water saving is decreased.

However, there may be room for water savings even if the slope is positive, but within the pre-determined rate limit, i.e. the ion concentration approaches the threshold at an acceptable low rate. If the ion concentration is within a range about the threshold (step 335), all settings may be maintained for the next cycle in step 345. If the ion concentration is, however, outside the range about the threshold (step 335), there is room for water saving as described for steps 337, 339 and 341. The table below summarises the logic for adapting the parameters and the target water saving.

| Step 331 C slope negative? | Step 333 C slope within limit? | Step 335 C within range? | Step 337 Target water saving ≥ initial? | Action | Step |
|---|---|---|---|---|---|
| yes | n/a | n/a | yes | decrease parameters, then increase target water saving | 341 |
| no | yes | no | yes | | |
| yes | n/a | n/a | no | increase target water saving | 339 |
| no | yes | no | no | | |
| no | no | n/a | n/a | increase parameters, then decrease target water saving | 343 |
| no | yes | yes | n/a | maintain settings | 345 |

Based on the cycle frequency and the de-ionising duration $T_d$ per cycle, the next non-de-ionising time $T_i$ per cycle is determined in step 347 before the next cycle starts with step 303.

Figure 4:
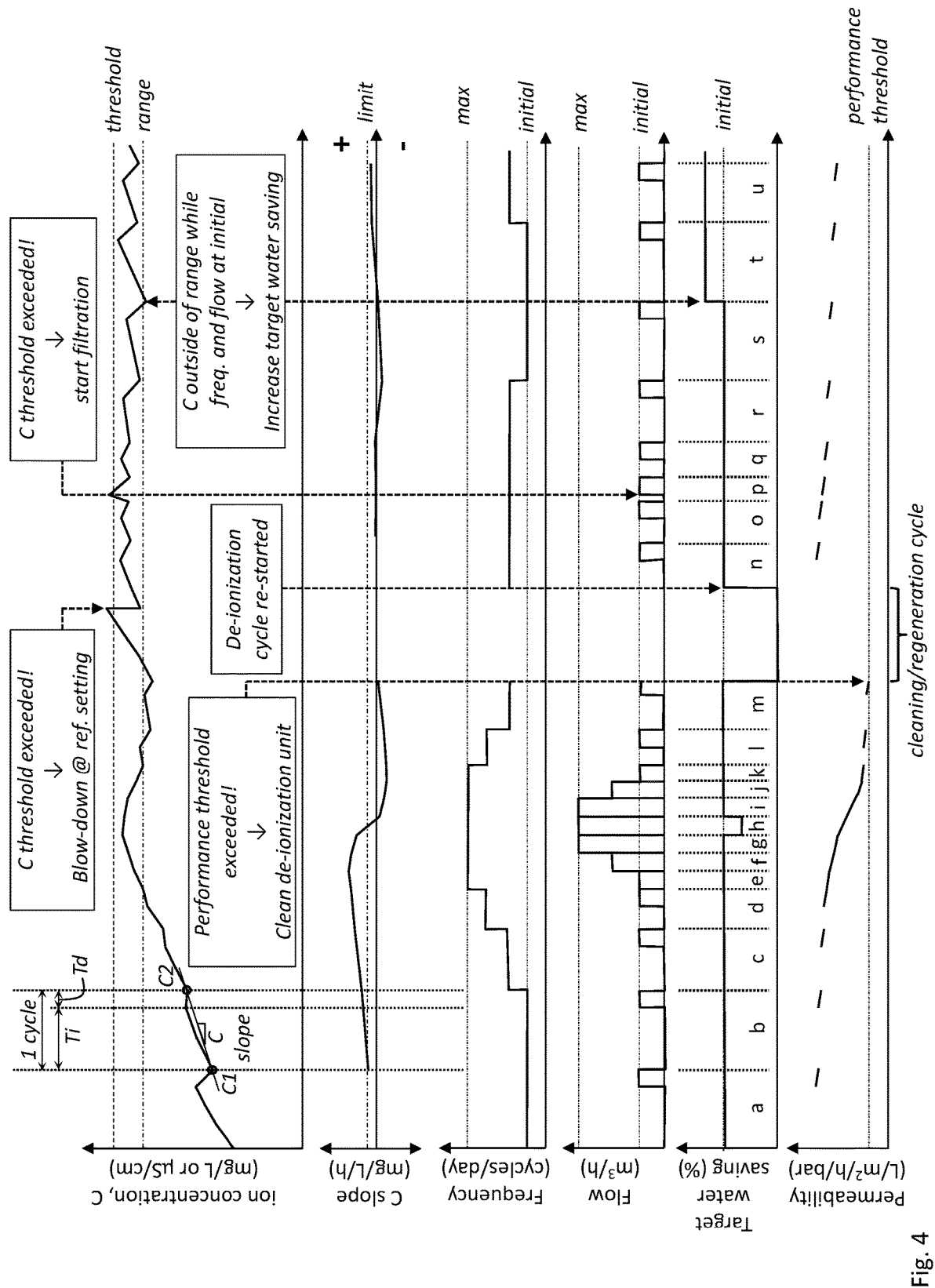
FIG. 4 is a view of several diagrams of the development of parameters and values over time when an example of a method disclosed herein is applied.

FIG. 4 shows an example how some parameters and values develop over time if the control algorithm as shown in FIG. 3 is applied. At the beginning, the cycle frequency and the permeate flow are initially set to be minimal. The ion concentration C is relatively far below the threshold and an initial target water saving is achieved. After the first cycle (a), all settings are maintained for the second cycle (b). After each cycle (a-u), the slope of C is determined as shown in cycle (b) as an average rate of change over a cycle period $T_i+T_d$. As the positive slope of C exceeds the limit in the second cycle (b) (see steps 331 and 333), the cycle frequency is increased for the third cycle (c). This means, $T_i$ is reduced in step 343 for the third cycle (c). As the ion concentration continues rising quickly towards the threshold in the following cycles (d) and (e), the cycle frequency reaches a maximum in cycle (e), so that the flow is increased for cycle (f). This is still not sufficient to bring down the slope of C, so that the flow is increased further in cycle (g), where it reached a maximum flow. So, the target water saving is decreased in cycle (h) according to step 343. This means that the blowdown water is increased in cycle (h), which brings here the ion concentration C down before it reaches the threshold. For the next cycle (i), the target water saving is set back to the initial target water saving (see step 339). The negative slope of C continues for cycles (j) and (k), so that the permeate flow is recursively reduced to the initial minimum in cycle (k) according to step 341. In the following cycles (l) and (m), the cycle frequency is reduced according to step 341.

As can be seen in the bottom diagram of FIG. 4, the permeability is monitored (step 321) during the de-ionising duration $T_d$. The permeability reduces with each cycle, i.e. the de-ionising performance degrades with each cycle. In cycle (m), the permeability falls below a lower performance threshold, which triggers a cleaning and/or regeneration cycle of the de-ionising unit 13, e.g. a cleaning-in place (CIP). The de-ionising unit 13 is not ready to use during the cleaning and/or regeneration cycle. As the ion concentration is always monitored in step 309, a blowdown at reference settings is triggered if the ion concentration exceeds the threshold during the cleaning and/or regeneration cycle as shown in FIG. 4.

Once the de-ionising unit 13 is cleaned and/or regenerated, the cycles continue with the latest setting in cycle (n). The positive slope of C is quite flat in cycle (N), so that the settings are maintained for cycle (o). In cycle (o), the slope of C towards the threshold is below the rate limit, but the ion concentration is close to the threshold, so that all setting are maintained for cycle (q). During $T_i$ of cycle (q), however, the ion concentration exceeds the threshold (step 311), which immediately triggers a start of de-ionising duration $T_d$, which successfully brings the ion concentration below the threshold. The settings are maintained for cycle (r). As the ion concentration is falling in (r), the cycle frequency is reduced for cycle (s) to the initial minimal cycle frequency. In cycle (s), the slope of C is found to be negative and both the permeate flow and the cycle frequency are at a minimum, so that the target water saving is increased for cycle (t) above the initially set target water saving. This results in a steep rise of the ion concentration in cycle (t), which triggers an increase in the cycle frequency for cycle (u). The water saving is thereby maximised while keeping the ion concentration below the threshold.

Where, in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustrative examples of the disclosure. It is to be understood that any feature described in relation to any one aspect or embodiment may be used alone, or in combination with other features described, and may also be used in combination with one or more features of any other of the aspects or embodiments, or any combination of any other of the aspects or embodiments. While at least one exemplary aspect or embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments dis-cussed herein.

In addition, "comprising" does not exclude other elements or steps, and "a" or one does not exclude a plural number. Furthermore, characteristics or steps which have been described with reference to one of the above exemplary aspects or embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alternatives can be made without departing from the spirit and scope of the disclosure, which should be determined from the appended claims and their legal equivalents.

While specific embodiments of the invention have been shown and described in detail to illustrate the application of the principles of the invention, it will be understood that the invention may be embodied otherwise without departing from such principles.

LIST OF REFERENCE NUMERALS 1 recirculating evaporative cooling facility
3 heat exchanger
5 cooling tower
7 reservoir
9 cooling circuit
11 filtration side-stream
13 de-ionising unit
15 feed tank
17 control module
19a-l sensors
21 pump
23 valves
25 signal connection
301 define initial parameters, references and thresholds
303 start cycle
305 add make-up water
307 record cumulative make-up water volume
309 monitor ion concentration
311 check if ion concentration exceeds threshold
313 check if non-de-ionising time per cycle has lapsed
314 check if de-ionisation unit is ready to use
315 calculate blowdown volume per cycle
317 calculate water recovery and de-ionising duration
319 operate de-ionising unit
321 check if performance crosses threshold
323 clean/regenerate de-ionising unit
325 check if de-ionising duration per cycle has lapsed
327 end cycle
329 calculate slope of ion concentration C
331 check if slope of C is negative
333 check if slope is within limit
335 check if C is within range about threshold
337 check if target water saving is at or above initial value
339 increase target water saving
341 decrease parameters, then increase target water saving
343 increase parameters, then decrease target water saving
345 maintain settings
347 calculate non-de-ionising time per cycle

What is claimed is:

1. A control system for suppressing biological growth, scale formation and/or corrosion in a recirculating evaporative cooling facility, wherein the control system is configured to:
monitor a value from at least one sensor, wherein the value is indicative of an ion concentration in a cooling liquid of the recirculating evaporative cooling facility; and
control at least one flow regulation device for regulating the hydraulic operation of at least one de-ionizing unit of the recirculating evaporative cooling facility,
wherein the control system is configured to control at least one parameter of hydraulic operation of the at least one de-ionizing unit using an adaptive target water saving as an input as long as the monitored value does not pass a pre-determined threshold, wherein the adaptive target water saving is indicative of a target reduction of blow-down water and/or a target reduction of make-up water.

2. The control system according to claim 1, wherein the at least one parameter of hydraulic operation of the at least one de-ionizing unit is:
a frequency of de-ionizing cycles or a flow through the at least one de-ionizing unit; or
a de-ionizing duration per de-ionizing cycle; or
a frequency of de-ionizing cycles or a flow through the at least one de-ionizing unit and a de-ionizing duration per de-ionizing cycle.

3. The control system according to claim 2, wherein the control system is configured to increase the flow through the at least one de-ionizing unit only if:
the frequency of de-ionizing cycles has reached a maximum; or
the de-ionizing duration per de-ionizing cycle has reached a maximum; or
the frequency of de-ionizing cycles has reached a maximum and the de-ionizing duration per de-ionizing cycle has reached a maximum.

4. The control system according to claim 1, wherein:
the control system is configured to recursively control the at least one parameter of hydraulic operation of the at least one de-ionizing unit;
the at least one parameter of hydraulic operation of the at least one de-ionizing unit is increased at least if the monitored value is changing towards the pre-determined threshold at a rate exceeding a pre-determined rate limit; and
the adaptive target water saving is increased at least if the monitored value is outside a pre-determined range about the pre-determined threshold and is not changing towards the pre-determined threshold at a rate exceeding the pre-determined rate limit and the at least one parameter of hydraulic operation of the at least one de-ionizing unit is at a respective initial parameter.

5. The control system according to claim 1, wherein:
the control system is configured to recursively control the at least one parameter of hydraulic operation of the at least one de-ionizing unit;
the at least one parameter of hydraulic operation of the at least one de-ionizing unit and the adaptive target water saving are maintained at least if the monitored value is within a pre-determined range about the pre-determined threshold and changing towards the pre-determined threshold at rate not exceeding a pre-determined rate limit.

6. The control system according to claim 1, wherein:
the control system is configured to recursively control the at least one parameter of hydraulic operation of the at least one de-ionizing unit;
the adaptive target water saving is decreased at least if the monitored value is changing towards the pre-determined threshold at a rate exceeding a pre-determined rate limit and the at least one parameter of hydraulic operation of the at least one de-ionizing unit is at a respective parameter maximum; and
the at least one parameter of hydraulic operation of the at least one de-ionizing unit is decreased at least if the monitored value is changing away from the pre-determined threshold and the adaptive target water saving is at or above an initial target water saving.

7. The control system according to claim 1, wherein:
the control system is configured to monitor a performance value of the at least one de-ionizing unit and trigger a regeneration cycle of the at least one de-ionizing unit or trigger a cleaning cycle of the at least one de-ionizing unit or trigger both a regeneration cycle and a cleaning cycle of the at least one de-ionizing unit if the performance value crosses a pre-determined performance threshold.

8. The control system according to claim 1, wherein the control system is configured to recursively adapt the adaptive target water saving, wherein the adaptive target water saving is increased at least if the adaptive target water saving is below an initial target water saving and
    the monitored value is changing away from the pre-determined threshold or
    the monitored value is outside a pre-determined range about the pre-determined threshold and is not changing towards the pre-determined threshold at a rate exceeding the pre-determined rate limit.

9. A recirculating evaporative cooling facility comprising a control system for suppressing biological growth, scale formation and/or corrosion in a recirculating evaporative cooling facility, wherein the control system is configured to:
    monitor a value from at least one sensor, wherein the value is indicative of an ion concentration in a cooling liquid of the recirculating evaporative cooling facility; and
    control at least one flow regulation device for regulating the hydraulic operation of at least one de-ionizing unit of the recirculating evaporative cooling facility,
    wherein the control system is configured to control at least one parameter of hydraulic operation of the at least one de-ionizing unit using an adaptive target water saving as an input as long as the monitored value does not pass a pre-determined threshold, wherein the adaptive target water saving is indicative of a target reduction of blow-down water and/or a target reduction of make-up water.

10. A method for suppressing biological growth, scale formation and/or corrosion in a recirculating evaporative cooling facility, the method comprising the steps of:
    monitoring a value that is indicative of an ion concentration in a cooling liquid of the recirculating evaporative cooling facility; and
    controlling at least one flow regulation device for regulating a hydraulic operation of
    at least one de-ionizing unit of the recirculating evaporative cooling facility, wherein at least one parameter of hydraulic operation of the at least one de-ionizing unit is controlled using an adaptive target water saving as an input as long as the monitored value does not pass a pre-determined threshold, wherein the adaptive target water saving is indicative of a target reduction of blow-down water and/or make-up water.

11. The method according to claim 10, wherein the at least one parameter of hydraulic operation of the at least one de-ionizing unit is a frequency of de-ionizing cycles or a flow through the at least one de-ionizing unit or a de-ionizing duration per de-ionizing cycle or any combination of a frequency of de-ionizing cycles, and a flow through the at least one de-ionizing unit and a de-ionizing duration per de-ionizing cycle.

12. The method according to claim 11, wherein the flow through the at least one de-ionizing unit is only increased if the frequency of de-ionizing cycles and/or de-ionizing duration per de-ionizing cycle has reached a maximum.

13. The method according to claim 10, wherein:
    the at least one parameter of hydraulic operation of the at least one de-ionizing unit is controlled recursively;
    the at least one parameter of hydraulic operation of the at least one de-ionizing unit is increased at least if the monitored value is changing towards the pre-determined threshold at a rate exceeding a pre-determined rate limit; and
    the adaptive target water saving is increased at least if the monitored value is outside a pre-determined range about the pre-determined threshold and is not changing towards the pre-determined threshold at a rate exceeding the pre-determined rate limit and the at least one parameter of hydraulic operation of the at least one de-ionizing unit is at a respective initial parameter.

14. The method according to claim 10, wherein:
    the at least one parameter of hydraulic operation of the at least one de-ionizing unit is controlled recursively; and
    the at least one parameter of hydraulic operation of the at least one de-ionizing unit and the adaptive target water saving are maintained at least if the monitored value is within a pre-determined range about the pre-determined threshold and changing towards the pre-determined threshold at rate not exceeding a pre-determined rate limit.

15. The method according to claim 10, wherein:
    the at least one parameter of hydraulic operation of the at least one de-ionizing unit is controlled recursively;
    the adaptive target water saving is decreased at least if the monitored value is changing towards the pre-determined threshold at a rate exceeding a pre-determined rate limit and the at least one parameter of hydraulic operation of the at least one de-ionizing unit is at a respective parameter maximum; and
    the at least one parameter of hydraulic operation of the at least one de-ionizing unit is decreased at least if the monitored value is changing away from the pre-determined threshold and the adaptive target water saving is at or above an initial target water saving.

16. The method according to claim 10, further comprising monitoring a performance value of the at least one de-ionizing unit and triggering a regeneration cycle of the at least one de-ionizing unit or a cleaning cycle of the at least one de-ionizing unit or both regeneration cycle and a cleaning cycle of the at least one de-ionizing unit if the performance value crosses a pre-determined performance threshold.

17. The method according to claim 10, wherein:
    the adaptive target water saving is adapted recursively;
    the adaptive target water saving is increased at least if the adaptive target water saving is below an initial target water saving and the monitored value is changing away from the pre-determined threshold or the monitored value is outside a pre-determined range about the pre-determined threshold and is not changing towards the pre-determined threshold at a rate exceeding the pre-determined rate limit.

18. A control system for suppressing biological growth, scale formation and/or corrosion in a recirculating evaporative cooling facility, wherein the control system is configured to:
    monitor a value from at least one sensor, wherein the value is indicative of an ion concentration in a cooling liquid of the recirculating evaporative cooling facility; and
    control at least one flow regulation device for regulating the hydraulic operation of at least one de-ionizing unit of the recirculating evaporative cooling facility by recursively controlling at least one parameter of hydraulic operation of the at least one de-ionizing unit based on an adaptive target water saving as long as the monitored value does not pass a pre-determined threshold, wherein:
    the at least one parameter of hydraulic operation of the at least one de-ionizing unit is increased at least if the monitored value is changing towards the pre-determined threshold at a rate exceeding a pre-determined rate limit and the adaptive target water saving is increased at least if the monitored value is outside a pre-determined range about the pre-determined threshold and is not changing towards the pre-determined threshold at a rate exceeding the pre-determined rate limit and the at least one parameter of hydraulic operation of the at least one de-ionizing unit is at a respective initial parameter, and/or the at least one parameter of hydraulic operation of the at least one de-ionizing unit and the adaptive target water saving are maintained at least if the monitored value is within a pre-determined range about the pre-determined threshold and changing towards the pre-determined threshold at rate not exceeding a pre-determined rate limit, and/or the adaptive target water saving is decreased at least if the monitored value is changing towards the pre-determined threshold at a rate exceeding a pre-determined rate limit and the at least one parameter of hydraulic operation of the at least one de-ionizing unit is at a respective parameter maximum and the at least one parameter of hydraulic operation of the at least one de-ionizing unit is decreased at least if the monitored value is changing away from the pre-determined threshold and the adaptive target water saving is at or above an initial target water saving.

* * * * *